US008437564B2

(12) United States Patent
Harmanci et al.

(10) Patent No.: US 8,437,564 B2
(45) Date of Patent: May 7, 2013

(54) IMAGE AND VIDEO COMPRESSION USING SPARSE ORTHONORMAL TRANSFORMS

(75) Inventors: Oztan Harmanci, Mountain View, CA (US); Onur G. Guleryuz, San Francisco, CA (US); Osman G. Sezer, Atlanta, GA (US)

(73) Assignee: NTT DoCoMo, Inc., Tokyo (JP)

( * ) Notice: Subject to any disclaimer, the term of this patent is extended or adjusted under 35 U.S.C. 154(b) by 766 days.

(21) Appl. No.: 12/186,439

(22) Filed: Aug. 5, 2008

(65) Prior Publication Data
US 2009/0060362 A1  Mar. 5, 2009

Related U.S. Application Data

(60) Provisional application No. 60/954,538, filed on Aug. 7, 2007.

(51) Int. Cl.
*G06K 9/36* (2006.01)
*G06K 9/46* (2006.01)

(52) U.S. Cl.
USPC ........... 382/248; 382/233; 382/235; 382/238; 382/250; 382/251

(58) Field of Classification Search ........... 382/232–253
See application file for complete search history.

(56) References Cited

U.S. PATENT DOCUMENTS 6,002,801 A * 12/1999 Strongin et al. ............. 382/233
6,028,636 A    2/2000 Matsui et al.
2001/0031096 A1* 10/2001 Schwartz et al. ............. 382/250
2003/0103681 A1*  6/2003 Guleryuz ..................... 382/275
2006/0153301 A1*  7/2006 Guleryuz ................. 375/240.16
2007/0110290 A1*  5/2007 Chang et al. ................. 382/128
2007/0160303 A1*  7/2007 Guleryuz et al. ............. 382/240
2007/0217506 A1*  9/2007 Yang et al. ............... 375/240.03
2008/0270055 A1* 10/2008 Rozell et al. .................... 702/71

FOREIGN PATENT DOCUMENTS
WO    WO 02/075661 A    9/2002

OTHER PUBLICATIONS

Varkonyi-Koczy, Recursive Overcomplete Signal Representations, Dec. 2001, IEEE Transactions on Instrumentation and Measurement, vol. 50, No. 6 pp. 1698-1703.*

Ji-Yang Chang et al., "Edge-based motion compensated classified DCT with quadtree for image sequence coding"; 1998, Signal Processing: Image Communication II, pp. 187-197.*

Dony, R.D., et al., "Optimally Adaptive Transform Coding", IEEE Transactions on Image Processing, IEEE Service Center, Piscataway, NJ, vol. 4, No. 10, Oct. 1, 1995, pp. 1358-1370.

(Continued)

*Primary Examiner* — Amir Alavi
*Assistant Examiner* — Kenny Cese
(74) *Attorney, Agent, or Firm* — Blakely, Sokoloff, Taylor & Zafman LLP

(57) ABSTRACT

A method and apparatus is disclosed herein for performing compression with sparse orthonormal transforms. One method includes receiving a block of data; classifying the block of data based on directional structure; selecting one of a plurality of available directional, orthonormal transforms to apply to the block based on results of classifying the block; and applying the selected transform to the block to generate a plurality of coefficients, thereby producing a compressed version of the block.

29 Claims, 12 Drawing Sheets

OTHER PUBLICATIONS

Chang, J-Y, et al., "Edge-based motion compensated classified DCT with quadtree for image equence coding", Signal Processing, Elsevier Science Publishers, vol. 11, No. 3, pp. 187-197.

Rao, K.R., et al., "Section 7.13: Activity Classification in Adaptive Transform Coding", Discrete Cosine Transform: Algorithms, Advantages, and Applications, Jan. 1, 1990, pp. 292-303.

International Search Report dated Nov. 10, 2008 for PCT/US08/072366, filed Aug. 6, 2008, 4 pages.

Written Opinion dated Nov. 10, 2008 for PCT/US08/072366, filed Aug. 6, 2008, 9 pages.

PCT International Preliminary Report on Patentability for corresponding PCT Patent Application No. PCT/US2008/072366, Feb. 18, 2010, 9 pgs.

Guleryuz, Onur G., et al., "Image Compression with a Geometrical Entropy Coder," Proc. IEEE Int'l Conf. on Image Proc. (ICIP2006), Atlanta, GA, Oct. 2006.

Said, A., et al., "A new fast and efficient image codec based on set partitioning in hierarchical trees," IEEE Trans. on Circuits and Systems for Video Technology, V. 8, pp. 243-250, 1996.

Xiong, Z., et al., "A DCT-based Embedded Image Coder," IEEE Signal Processing Letters, vol. 3, 11, pp. 289-290, Nov. 1996.

Joint Video Team of ITU-T and ISO/IEC JTC 1, "Draft ITU T Recommendation and Final Draft International Standard of Joint Video Specification (ITU-T Rec. H.264 ISO/IEC 14496-10 AVC)", Joint Video Team (JVT) of ISO/IEC MPEG and ITU-T VCEG, JVT-G050, Mar. 2003.

Malvar, Henrique S., "Biorthogonal and nonuniform lapped transforms for transform coding with reduced blocking and ringing artifacts", IEEE Trans. Signal Proc., pp. 1043-1053, Apr. 1998.

Le Pennec, E., et al., "Sparse geometric image representation with bandelets", IEEE Trans. Image Proc., Apr. 2005.

\* cited by examiner

| $\lambda=\lambda_1$ | | | $\lambda=\lambda_2$ | | | $\lambda=\lambda_3$ | | | $\lambda=\lambda_4$ | | |
|---|---|---|---|---|---|---|---|---|---|---|---|
| p=4 | p=8 | p=16 | p=4 | p=8 | p=16 | p=4 | p=8 | p=16 | p=4 | p=8 | p=16 |
| $G_1$ $G_2$ ... $G_9$ | $G_1$ $G_2$ ... $G_9$ | $G_1$ $G_2$ ... $G_9$ | $G_1$ $G_2$ ... $G_9$ | $G_1$ $G_2$ ... $G_9$ | $G_1$ $G_2$ ... $G_9$ | $G_1$ $G_2$ ... $G_9$ | $G_1$ $G_2$ ... $G_9$ | $G_1$ $G_2$ ... $G_9$ | $G_1$ $G_2$ ... $G_9$ | $G_1$ $G_2$ ... $G_9$ | $G_1$ $G_2$ ... $G_9$ |

Figure 11

IMAGE AND VIDEO COMPRESSION USING SPARSE ORTHONORMAL TRANSFORMS

PRIORITY

The present patent application claims priority to and incorporates by reference the corresponding provisional patent application Ser. No. 60/954,538, titled, "Image and Video Compression Using Sparse Orthonormal Transforms" filed on Aug. 7, 2007.

FIELD OF THE INVENTION

The present invention relates to the field of image and video compression/decompression systems; more particularly, the present invention relates to the use of sparse orthonormal transforms in compression and decompression systems.

BACKGROUND OF THE INVENTION

Image compression and hybrid video compression consists of partitioning a frame into blocks, predicting each block and transforming the residual error using a block transform. Video compression algorithms generally use motion compensation from previous frames, whereas image compression algorithms may use previously encoded neighboring blocks to generate the prediction or may not use prediction at all. After transformation, the generated coefficients are quantized and then entropy coded.

The DCT has been the transform of choice for a long time for image and video compression due to its successful compaction of the correlations that exist in natural images. Although the DCT is in general successful, it fails when there are singularities (i.e., edges) in the block that is being transformed. Such a block contains a strong edge that is not aligned in the horizontal or vertical direction. As a result, the DCT generates many non-zero coefficients to represent the block, which increases the required bitrate.

There are a number of prior art solutions, but these have drawbacks. Some drawbacks of prior art solutions can be summarized as follows. Some of the prior solutions are based on wavelets, which are not block based and are not suitable for use in state-of-the-art block based video and image codecs. Prior art solutions based on wavelets also do not provide finely granular decompositions in frequency, i.e., their frequency selectivity is limited, which may adversely affect compression performance. Another group of prior solutions use prediction from previously decoded portions of the data. These set of algorithms are not suitable for use in a video compression setting where the residual signal is not correlated beyond motion compensation block boundaries. Another group of related prior solutions also train the transforms. However, these solutions put a constraint on the transform such that directionality is preserved. This may not necessarily be true in a rate distortion optimal sense.

SUMMARY OF THE INVENTION

A method and apparatus is disclosed herein for performing compression with sparse orthonormal transforms. In one embodiment, the method comprises receiving a block of data; classifying the block of data based on directional structure; selecting one of a plurality of available directional, orthonormal transforms to apply to the block based on results of classifying the block; and applying the selected transform to the block to generate a plurality of coefficients, thereby producing a compressed version of the block.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 11 shows an example look-up table (LUT) for N=9 classes, L=4λ's and P=3 different block sizes.

DETAILED DESCRIPTION OF THE PRESENT INVENTION

Figure 1A:
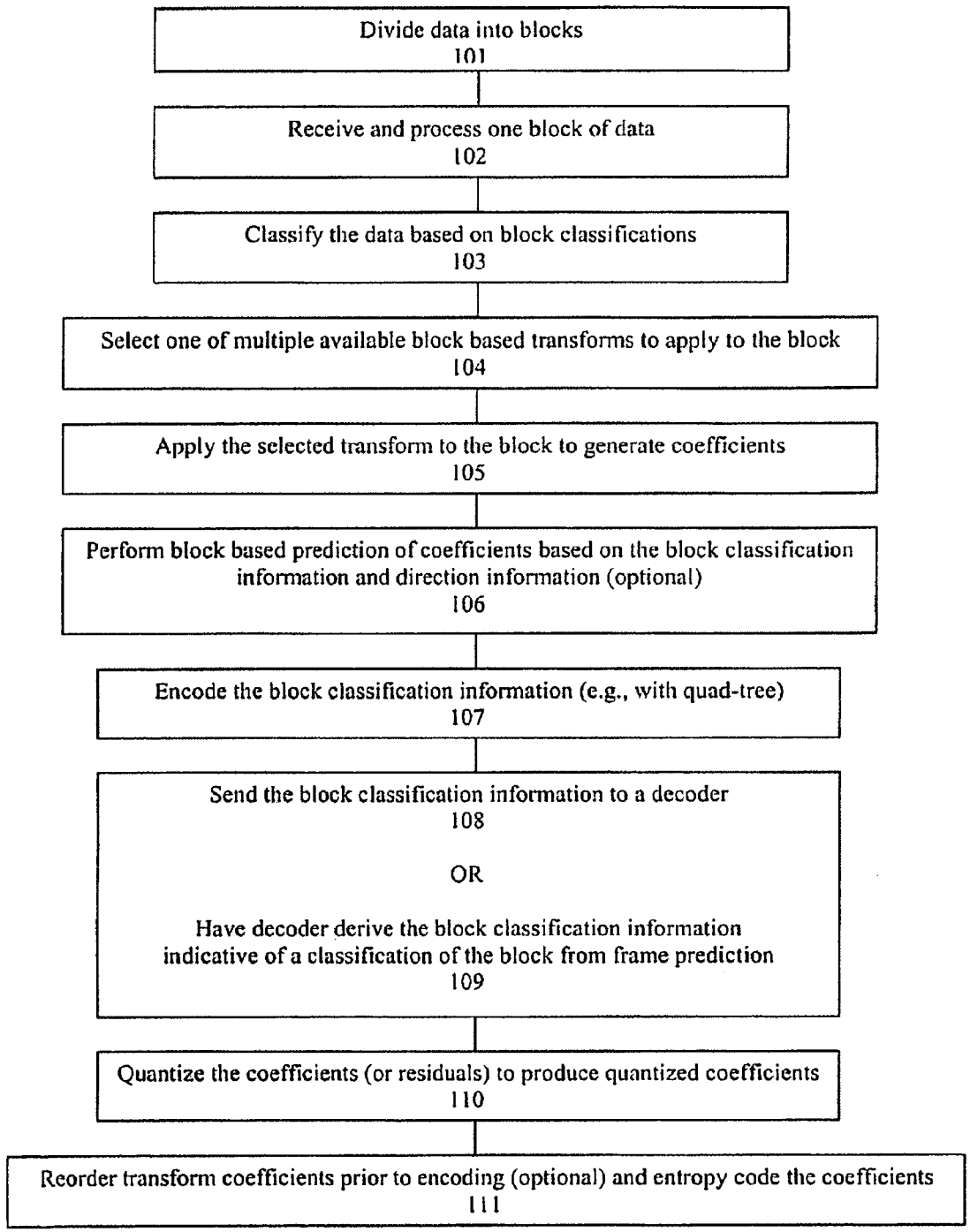
FIG. 1A is a flow diagram of one embodiment of a compression process.

Improved block transforms for use in compression applications is described. Techniques described herein rely on classification of blocks and in one embodiment use an optimal transform designed for the corresponding class. In one embodiment, the block classification and transform optimization are performed jointly using a set of training blocks.

In one embodiment, the presented techniques automatically derive the optimal classification. For piecewise smooth images with singularities along curves, one such classification is based on geometric flow, which exploits the correlations along the singularities of an image. Traditional transforms fail along such singularities due to their geometry-unaware design.

In a compression framework, the generated optimal transforms can be considered as alternatives to the well-known Discrete Cosine Transform (DCT). The encoder can choose to encode a block with a designed optimal transforms or the DCT depending on the rate distortion optimality.

These techniques can be used in image compression for compressing a still image, or they can also be used in video compression to compress a video. In such a compression framework, the technique transmits side-information that notifies the decoder of the index of which transform to use for each block. When compressing video, the method may choose not to transmit the side-information for all blocks. In one embodiment, this is done at the encoder by looking at the predictability of optimal transform index and performing a rate distortion analysis. As a result no side-information may be transmitted or side-information may be transmitted for only selected blocks. Accordingly, during decoding, if a block's transform is not specified by the encoder (omitted from the side-information), the decoder can use the previously decoded frames and the motion vectors for the block to determine the index of which transform to use for that block.

In one embodiment, the transform/classification design techniques described herein successfully capture the geometric flow in each block using the appropriate transform. Experimental results demonstrate the effective performance of these techniques in a rate-distortion sense and in a visual quality sense. In cases where there are strong edges, these techniques automatically impose directionality on the designed transforms. Then, the encoder chooses the best transform in the rate distortion sense for each block and transmits the transform identifier and the coefficients. The overhead of transmitting the identifier is easily balanced by the efficiency of the transform to generate far fewer coefficients to represent the block.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

FIG. 1A is a flow diagram of one embodiment of a compression process. The process is performed by processing logic that may comprise hardware (e.g., circuitry, dedicated logic, etc.), software (such as is run on a general purpose computer system or a dedicated machine), or a combination of both.

Referring to FIG. 1A, the process begins by processing logic dividing data into blocks (processing block 101). The data may be an image, video or other data representing an image or video (e.g., transform coefficients). In one embodiment, the block is part of an intra frame being compressed.

In one embodiment, the data representing the block comprises a vector of transform coefficients. In one embodiment, the vector of transform coefficients comprises a vector of lapped transform coefficients. In another embodiment, the vector of transform coefficients comprises a vector of wavelet transform coefficients. In one embodiment, the block has a size of K×K and the vector of transform coefficients has a second size of $K^2 \times 1$, where K is an integer.

Processing logic receives and processes one block of data (processing block 102). Parallel processing may be used to process multiple blocks simultaneously.

Next, processing logic classifies the data based on block classifications (processing block 103). In one embodiment, the results of classifying the block include block classification information indicative of a classification of the block. In one embodiment, each of the block classifications is associated with one of the available transforms. In one embodiment, the block classifications and plurality of transforms are jointly and iteratively optimized in a rate-distortion sense.

Based on results of the classification, processing logic selects one of multiple available block based transforms to apply to the block (processing block 104) and applies the selected transform to the block to generate a plurality of coefficients (processing block 105).

In one embodiment, processing logic also optionally performs prediction of coefficients based on the block classification information and direction information (processing block 106).

In one embodiment, the available transforms include multiple directional, orthonormal transforms. In one embodiment, one or more of the transforms are created by an iterative process in which blocks of training data are classified and then subjected to the application of transforms repeatedly. In one embodiment, the available transforms include a DCT transform. In one embodiment, the available transforms include one or more transforms optimized for various quantization and block size parameters.

In one embodiment, processing logic also encodes the block classification information (processing block 107). In one embodiment, processing logic encodes the block classification information using a quad-tree. Processing logic in the encoder sends the block classification information to a decoder (processing block 106). Optionally, processing logic conditionally encodes the classification information based on the side-information that is determined and transmitted for the past and current frames and based on other compressed data (e.g., data specifying transform coefficients, motion vectors, previously decoded frames, etc.) that has been sent until that point.

Alternatively, the results of classifying the block include block classification information, and optionally processing logic in the decoder derives the block classification information indicative of a classification of the block from frame prediction (processing block 109). In one embodiment, processing logic in the decoder derives the block classification information when decompressing INTER frames.

Processing logic also quantizes the coefficients (or residuals) to produce quantized coefficients (processing block 110). In one embodiment, the quantized coefficients comprise predicted coefficients.

After quantization, processing logic reorders transform coefficients prior to encoding (optional) and entropy codes the coefficients (processing logic 111). In one embodiment, each of the available transforms is associated with a distinct zig-zag pattern, and reordering transform coefficients is performed by applying a zig-zag pattern associated with the transform coefficients.

In one embodiment, the process is repeated until all the blocks have been processed.

Figure 1B:
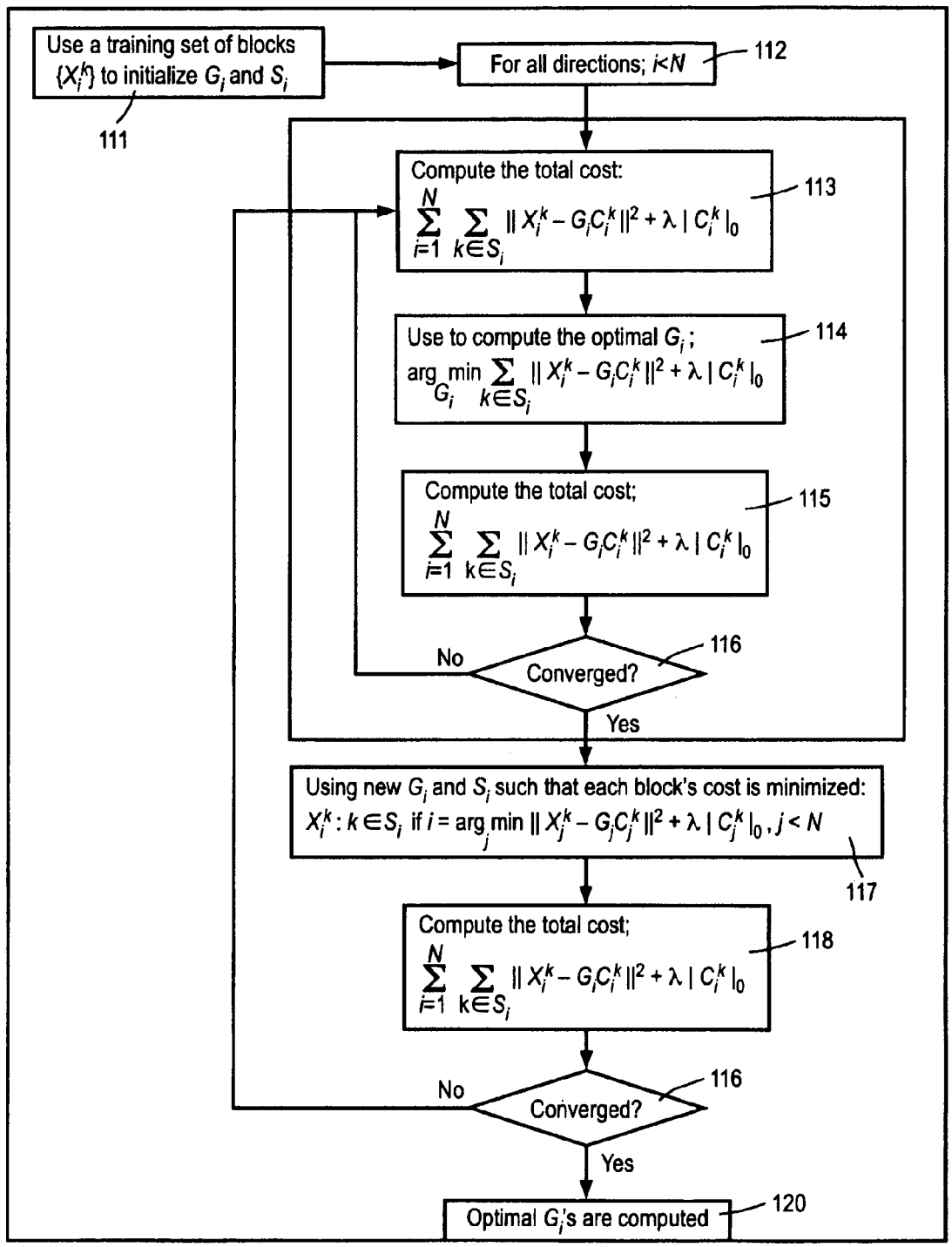
FIG. 1B is another flow diagram of one embodiment of an iterative joint classification and transform optimization process.

FIG. 1B is a flow diagram of another embodiment of a process for joint transform optimization and block classification The process is performed by processing logic that may comprise hardware (e.g., circuitry, dedicated logic, etc.), software (such as is run on a general purpose computer system or a dedicated machine), or a combination of both.

Referring to FIG. 1B, the process begins by processing logic selecting a block size to design the transforms, and generating a training set from a training set of images and videos (processing block 101). An initial classification is also performed on the training blocks.

Then an iterative optimization process is performed. This process involves estimating the optimal transforms for the initial classification, then estimating optimal sparse set of coefficients. Once the coefficients are found, transforms are optimized using the given coefficients. With the updated transforms, another set of sparse coefficients are calculated, and this iteration continues until convergence.

A rate distortion metric is used in the optimizations the above optimization process. Once the above iterations converge, the blocks are classified again such that the same rate distortion metric is minimized. With the new classification, the optimization above is repeated. After new transforms are calculated for the new classification, the classification is performed again until the rate distortion metric and the new classification converge. Optimizing these operations together is effectively a joint optimization of classification and transforms.

In one embodiment, transforms are optimized for different quantization levels, and for different block sizes and are stored in a lookup table both at the decoder and at the encoder. In one embodiment, once the transforms are optimized they are shared between encoder and decoder for use in compression of any image or video.

In an image compression framework, at the encoder, sending the classification information for each block may incur too much overhead. In one embodiment, a quad-tree structure is used to control the amount of overhead caused by classification. In one embodiment, this quad-tree is built in a rate distortion optimal manner. In a video compression framework, in one embodiment, the classification information is not sent for all of the blocks. For example, the encoder and the decoder can both use the motion vectors and the corresponding data on the previously decoded reference frame to determine the classification of each block, or conditionally encode/decode more efficiently. In one embodiment, the encoder also chooses to transmit the classification information for only a subset of blocks, whereas the classification of others blocks are determined using the motion vectors and reference frames. Once the encoder determines the classification of each block and it uses the corresponding transform to generate the coefficients.

These coefficients can be used in a compression algorithm such as, for example, H.264 or any other block based image/video codec.

The techniques described herein can also be applied to other types of signals such as, for example, audio, higher dimensional signals such as images of medical volumes, etc.

Sparse Othonormal Transforms

In one embodiment, the optimal orthonormal transforms are computed for k classes (i=1 . . . k) such that the cost in a rate-distortion sense is minimized over training data Other types of costs can also be used, for example, cost based on distortion alone, cost based on rate/entropy alone, cost based on classification accuracy, etc.

Figure 6:
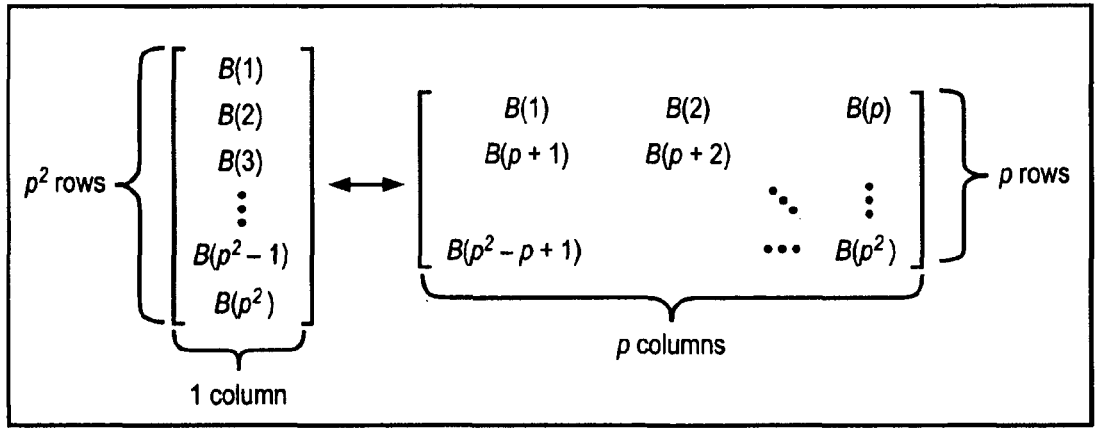
FIG. 6 shows serialization and de-serialization of a two-dimensional (2D) block to and from a one-dimensional (1D) vector.

Let $G_i$, $1 < i < N$ denote the transforms that are to be designed. Let $X_i^k$, $1 < k < K$, denote the k-th block in the training set classified as i-th class. In one embodiment, $X_i^k$ is a 2D array serialized into a vector as shown in FIG. 6. Let $S_i$ denote the set of blocks labeled as i-th class. In one embodiment, an iterative optimization method is used, which computes $S_i$ and $G_i$ iteratively. In one embodiment, an iterative optimization method starts with initial classification of the blocks. In one embodiment, the initial classification is done based on the image gradient at each block where a heuristic based initial classification of the blocks in the training set is performed, which uses image gradients to determine the expected classification and computes initial $S_i$. In one embodiment, transforms $G_i$ are initialized to the Karhunen-Loeve Transforms using the blocks corresponding to each class as determined by $S_i$. Then the iterative optimization process begins.

In one embodiment, the transforms are designed according to the following joint optimization problems;

$$G_i = \underset{G}{\mathrm{argmin}} \sum_{k \in S_i} \|X_i^k - G C_i^k\|^2 + \lambda |C_i^k|_0 : C_i^k = \underset{C}{\mathrm{argmin}} \|X_i^k - G_i C\|^2 + \lambda |C|_0 \quad (1)$$

$C_i^k$ are the optimal coefficients of $X_i^k$ generated by the transform $G_i$ for a given Lagrange multiplier $\lambda$. $|C|_0$ denotes the $L_0$ norm of the coefficients, which is equal to the number of non-zero elements in C.

For each class of blocks, equation (1) is solved and an optimal transform if generated for that class. An iterative optimization is disclosed, and further details are given in the following subsections.

First, in one embodiment, the optimization algorithm finds the sparsest representation for a given transform $G_i$. This can generically be formulated as $$C_i^k = \underset{C}{\operatorname{argmin}} \|X_i^k - G_i C\|^2 + \lambda |C|_0, \; \forall k \in S_i \quad (2)$$

The solution of equation (2) is to hard-threshold the components of $C_i^k$ with a threshold equal to $\sqrt{\lambda}$. Let $z_i^k = G_i^{-1} X_i^k$ then the components of the optimal $C_i^k$ are given as $$C_i^k(l) = \begin{cases} Z_i^k(l), & |Z_i^k(l)| \geq \sqrt{\lambda} \\ 0, & |Z_i^k(l)| < \sqrt{\lambda} \end{cases}$$

In one embodiment, the next step of optimization process is to determine optimal orthonormal transforms that minimize the reconstruction error for the given coefficients. Then, $$\sum_{k \in S_i} \lambda |C_i^k|_0$$

is constant for all $G_i$. For each i, such that $1 \leq i \leq N$, the following minimization term is used.

$$G_i = \underset{G}{\operatorname{argmin}} \sum_{k \in S_i} \|X_i^k - G C_i^k\|^2 \text{ such that } G_i^T G_i = I \quad (3)$$

Equation (3) can be written as $$G_i = \underset{G}{\operatorname{argmin}} \sum_{k \in S_i} Tr\{(X_i^k - G C_i^k)^T (X_i^k - G C_i^k)\} \quad (4)$$
$$\text{such that } G_i^T G_i = I$$

where $Tr\{.\}$ denotes the trace of a matrix. Rearranging terms, this results in $$G_i = \underset{G}{\operatorname{argmin}} \sum_{k \in S_i} (-2 Tr\{C_i^k X_i^{kT} G\}) \text{ such that } G^T G = I \quad (5)$$

Let $$Y_i = \sum_{k \in S_i} C_i^k X_i^{kT}$$

and let $Y_i = U_i \Lambda_i^{1/2} V_i^T$ denote the SVD of $Y_i$; hence, $U_i$ and $V_i$ are orthonormal and $\Lambda_i$ is diagonal. Then the solution to equation (5) becomes $$G_i = V_i U_i^T. \quad (6)$$

The expression in (1) can be solved by successive minimization of the cost functions shown in (2) and (3) one after the other until the cost reaches a steady state.

The optimization process discussed above is first performed for an initial classification of blocks. In another embodiment, the initial classification of blocks is performed using an image gradient based algorithm, which computes the block gradients using the Sobel operator in a manner well known in the art. Then the gradient is mapped to one of the 8 directions. If no dominant direction is found, the block is classified as directionless and the DCT is used. After convergence, processing logic reclassifies the blocks using the determined transforms. In one embodiment, training blocks are reclassified according to the following minimization problem. Let X be a training block.

$$\operatorname{Class}\{X\} = \underset{j}{\operatorname{argmin}} \left[ \underset{C}{\min} \|X - G_j C\|^2 + \lambda \|C\|_0 \right]. \quad (7)$$

Reclassified blocks are then used in the above optimization process (Equations 2-6) to determine a new set of transforms until joint convergence of classification and transform optimization is reached.

Thus, in one embodiment, after initial classification, an iterative optimization method is used first to optimize transforms and coefficients, and then reclassify using the optimal transforms in a rate distortion optimal way, and then again optimize the transforms $G_i$ iteratively until convergence.

In one embodiment, to determine the optimal transform for each block, a block on the image or the motion compensated video frame is assigned a transform out of N possible transforms, which are selected from a look-up table (LUT) according to the quantizer dead-zone size and the block size.

Figure 13:
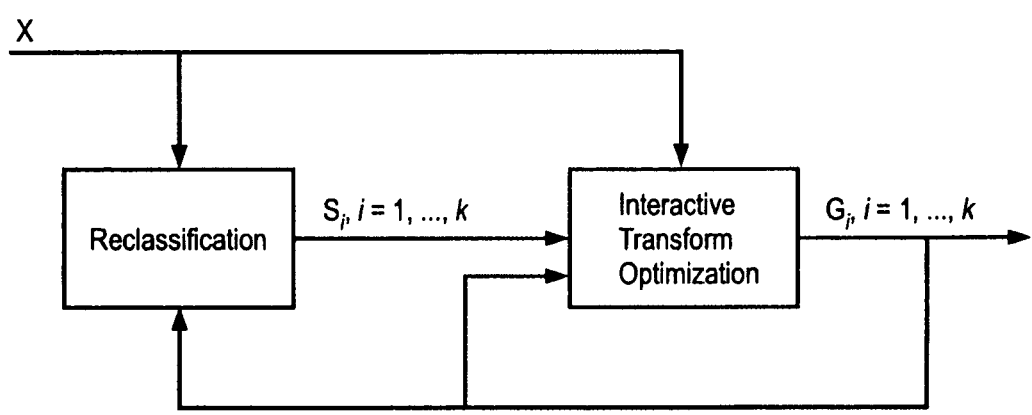
FIG. 13 illustrates an overview of one embodiment of an iteration process.

In one embodiment, a rate distortion cost is computed for using each transform on the block. The one that minimizes the cost is chosen. For video compression, in addition to rate distortion optimality, the transforms may be chosen using previously decoded frames and motion vectors. For image compression, the overhead of transmitting the optimal transform and adaptive block size is performed using a rate-distortion optimally built quad-tree. FIG. 13 illustrates an overview of one embodiment of an iteration process. The flow diagram of one embodiment of the overall iterative joint optimization process is shown in FIG. 1B.

In one embodiment, the classification of the blocks result in directional transforms, and therefore classifications are also referred to as directions.

In one embodiment, the block utilized for transforms is a p×p block so each transform is $p^2 \times p^2$. p could be 4, 5, 8, 16, etc. In one embodiment, p=8. In one embodiment, the size of the transform is varied spatially so that different block sizes are used at different locations of an image, for example $p_1=4$, $p_2=8$, $p_3=16$. If the block size is p×p, the output of the above optimization process is $p^2$ basis functions for each classification $i \leq N$.

$$G_i = [G_i(1) G_i(2) \ldots G_i(p^2)] \quad (8)$$

where $G_i(l), l=1, \ldots, p^2$, denote the basis functions for the transform $G_i$.

After optimization is completed, in one embodiment, the basis functions for each class are ordered depending on the application. For example, the basis functions are ordered according to the power compaction capability over the training set. Let $F_i^n$ denote the compaction achieved by n-th basis of transform $G_i$ over the training set $S_i$.

$$F_i^n = \sum_{k \in S_i} \langle G_i(n)^T, X_i^k \rangle^2. \quad (9)$$

Then the basis functions are ordered such that $F_i^n > F_i^{n+1}$, $n < p^2 - 1$. Basis functions ordered in such a way match the ordering of zigzag ordered DCT basis functions. Thus, in one embodiment, each directional transform has an ordering associated with it. In one embodiment, the ordered transform coefficients are quantized and then inverse-zigzag scanned so that they can be entropy coded in ways similar to the entropy coding of DCT coefficients. Depending on the entropy coder, the quantized coefficients have to be re-ordered using the associated zig-zag ordering prior to entropy coding, etc.

In another embodiment, basis functions can be mapped to the DCT basis functions based on the frequency content.

When the transforms are used in a block based compression framework that uses quantization, the quantization step size and $\lambda$ are related by the solution to Equation (2). Let $\Delta$ denote the quantization level for zero-bin (i.e., dead-zone), such that Quantize($x$)=0 if ($|x| < \Delta$)

Then $\lambda = \Delta^2$.

In one embodiment, transforms are optimized for different $\lambda$ values. Furthermore, for each $\lambda$, transforms are also optimized for different block sizes. Then a multitude of transforms are generated and stored in a look-up-table (LUT)

$$G_i^{\lambda,p} = LUT(i,l,p) 1 < i < N, 1 < l < L, 2 < p < P$$

where L is the number of unique $\lambda$'s, and P is the biggest block size desired by the application. Techniques described herein to generate the transforms do not limit L or P. An example LUT is shown in FIG. 11. For ease of notation $\lambda_l$ and $p$ have been dropped from the superscript of $G_i$. The LUT contains $G_i(\lambda_l, p)$ for all $1 < i < N$, $1 < l < L$ and $2 < p < P$. Depending on the quantization method, let $\Delta$ denote the dead-zone that corresponds to the zero-bin. Then $\lambda$ is computed as $\lambda = \Delta^2$, and the transforms that correspond to that $\lambda$ from the LUT are used. Thus, these transforms are quantization adaptive.

In one embodiment, there are N transforms from which to choose. In one embodiment, N=9. In one embodiment, one of the transforms is constrained to be DCT, such that there are 8 directional transforms+1 DCT.

In one embodiment, the transforms can be overlapping, which are well-known in the art. In such a case the transform matrix size is $q^2 \times p^2$, $q > p$. The formulation presented in Equations (2-9) can be used to determine the optimal lapped transforms.

In one embodiment, separable transforms can be used by modifying the transformation formulation. Then a similar iterative optimization method can be used to determine the optimal $H_i$.

In another embodiment, the optimization problem can be stated in terms of pair-wise Givens rotations and lifting parameters to achieve implementations. In such a case, again a similar iterative optimization can be used.

Figure 2:
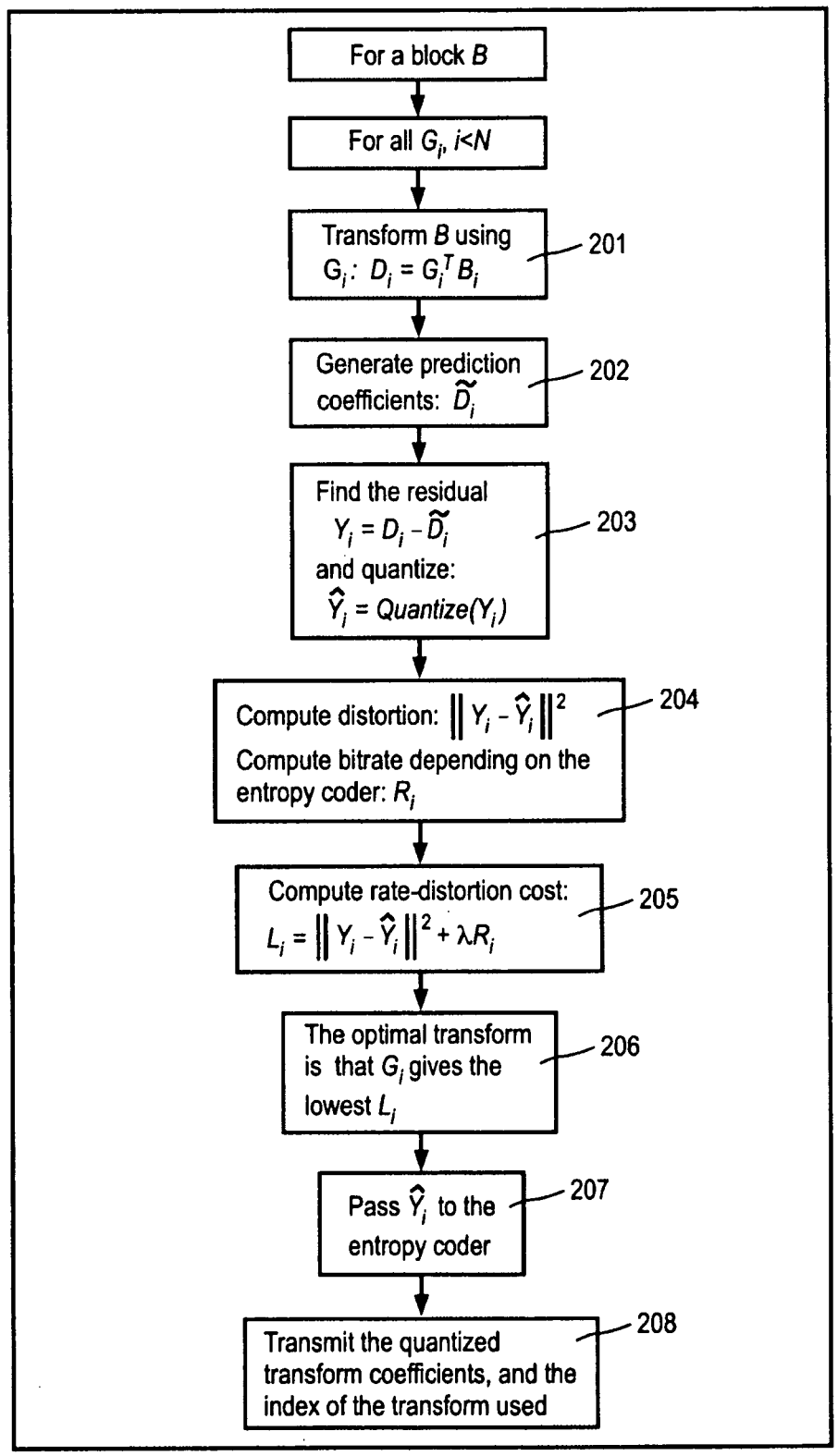
FIG. 2 is a flow diagram of one embodiment of a rate-distortion optimal transform selection and predictive block based compression process.
Figure 3:
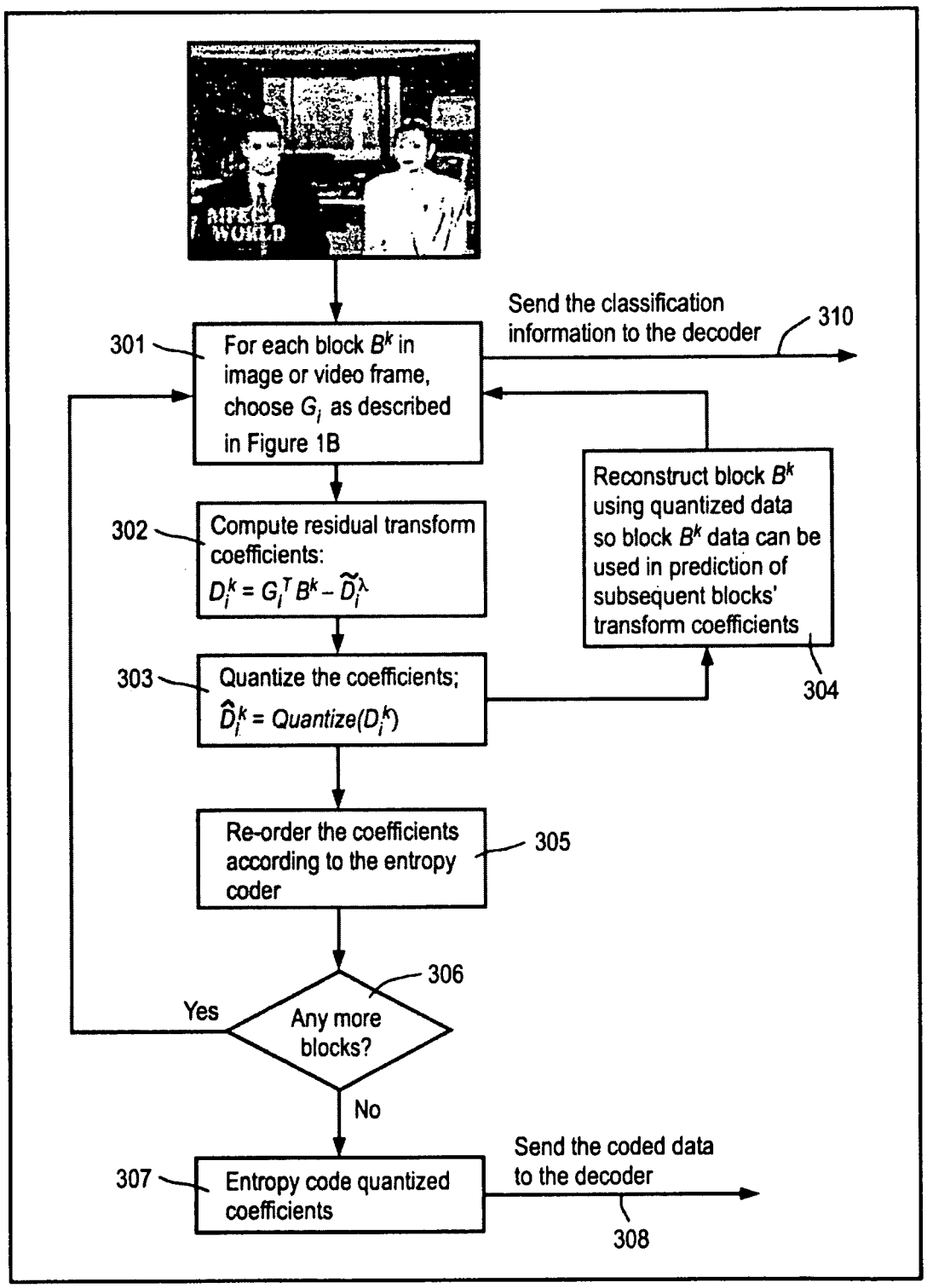
FIG. 3 is a flow diagram of one embodiment of a process for optimizing an using transforms in block based image and video encoders.

In one embodiment, the designed optimal transforms can be used for block based compression of images and videos using prediction as shown in FIGS. 2 and 3, discussed in more detail below. Let $B_i^n$ denote the n-th block in the image or video frame that is labeled as i-th class. Let $D_i^n = G_i^T B_i^n$ denote the transformed coefficients. Then prediction coefficients ($\tilde{D}_i^n$) are first generated for each block. The residual coefficients are computed as the difference of the original coefficients and the predicted coefficients ($Y_i^n = D_i^n - \tilde{D}_i^n$). Then residuals are quantized ($\hat{Y}_i^n = $Quantize$(Y_i^n)$) and entropy coded. Quantization can be scalar or vector. After quantization, block is reconstructed and stored as the reconstructed coefficients ($\hat{D}_i^n = \tilde{D}_i^n + \hat{Y}_i^n$). $\tilde{D}_i^n$ can be generated using the previously encoded blocks on the same image, previously encoded blocks on the past images in a video, or using a combination of both.

FIG. 2 is a flow diagram of one embodiment of a process for forming rate distortion optimal transform selection and predictive block based compression. The process is performed by processing logic that may comprise hardware (e.g., circuitry, dedicated logic, etc.), software (such as is run on a general purpose computer system or a dedicated machine), or a combination of both.

Referring to FIG. 2, for a block B and for all transformed $G_i$, where i is less than N, the process begins by processing logic transforming block B using transform $G_i$ to produce transformed coefficients using the following formula:

$$D_i = G_i^T B$$

(processing block 201). Next, processing logic generates prediction coefficients $\tilde{D}_i$ for each block (processing block 202). After generating the prediction coefficients, $\tilde{D}_i$, processing logic computes the residual coefficients according to the following equation:

$Y_i = D_i - \tilde{D}_i$ and quantizes the residual coefficients according to the following:

$$\hat{Y}_i = \text{Quantize}(Y_i)$$

(processing block 203), which is the difference between the original coefficients and the predicted coefficients. Once the residual coefficients have been computed and quantized, processing logic computes the distortion according to the following equation:

$$\|Y_i - \hat{Y}_i\|^2$$

and computes the bit rate based on the entropy coder $R_i$ (processing block 204). Alternatively, the bit rate can be estimated using a model.

Next, processing logic computes the rate-distortion cost (processing block 205). In one embodiment, the rate-distortion cost is computed with the following equation:

$$\cdot L_i = \|Y_i - \hat{Y}_i\|^2 + \lambda R_i$$

The processing logic selects the optimal transform as the transform that gives the lowest rate distortion costs (processing block 206). Processing logic also passes the quantized residual coefficients $\hat{Y}_i$ to the entropy coder where they are entropy coded (processing block 207) and transmits the quantized transform coefficients and the index of the transform used to the decoder (processing block 208).

FIG. 3 is a flow diagram one embodiment of a process for optimizing the selection of the transform and using the proposed transform in a block based image and video encoding system. The process is performed by processing logic that may comprise hardware (e.g., circuitry, dedicated logic, etc.), software (such as is run on a general purpose computer system or a dedicated machine), or a combination of both.

Referring to FIG. 3, for each block $B^k$ in the image or video frame, processing logic chooses the transform $G_i$ as described in FIG. 1B (processing block 301). Processing logic also sends the classification information to the decoder as described herein (processing block 310). After choosing the transform $G_i$, processing logic computes the residual transform coefficients (processing block 302). In one embodiment, the residual transform coefficients are computed according to the following equation:

$$\hat{D}_i^k = G_i^T B^K - \hat{D}_i^K$$

Then processing logic quantizes coefficients according to the following:

$$\hat{D}_i^k = \text{Quantize}(D_i^K)(\text{processing block 303}).$$

After quantizing the coefficients, processing logic reconstructs the block $B^k$ using quantized data so that block $B^k$ data can be used in the prediction of subsequent blocks' transform coefficients (processing block 304) and transitions to processing block 301 where the process repeats.

Also, after quantizing the coefficients, processing logic reorders the coefficients according to entropy coder (processing block 305) and tests whether there are any more blocks to process (processing block 306). If there are, the process transitions to processing block 301 and the process repeats. If not, processing logic transitions to processing block 307 where processing logic entropy codes the quantized coefficients. After entropy coding, processing logic sends the coded data to the decoder (processing block 308).

Figure 4:
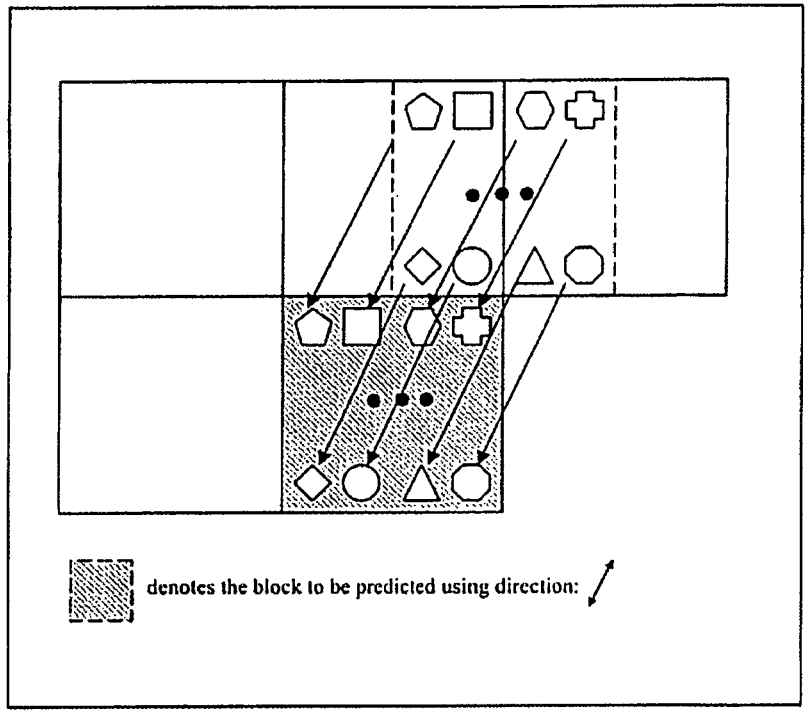
FIG. 4 illustrates one embodiment of a process for predicting coefficients from the blocks on the same frame.

In one embodiment, the coefficients of the current block is first predicted. In an image compression application, this involves prediction from previously encoded blocks such as in FIG. 4, and in a video coding application this prediction is done via motion compensation from previously encoded frames such as in FIG. 5. In one embodiment, prediction for image compression is performed using the classification of the current block in the image. FIG. 4 illustrates one embodiment of a coefficient prediction process for predicting coefficients from the blocks of the same frame. Referring to FIG. 4, each symbol denotes a separate coefficient and each symbol in the crosshatched block is predicted from its corresponding symbol. With respect to the prediction process, the direction of the block is used to determine the corresponding nearest block in the previously decoded blocks in the image. If the corresponding block is not encoded using the same classification, then only the DC coefficient of the block is predicted by averaging all of the neighboring blocks. If the corresponding prediction block overlaps two or more blocks, both blocks must be in the same direction as the current block. Then the overlapping block is used as the predicting block. If the classification information turns out to be non-directional, then the encoder searches the previously encoded blocks to find a suitable block to use for prediction. This block can overlap the block boundaries. In one embodiment, the search criteria are such that, the optimal classification found in the candidate block should match the classification of the current block. When a candidate block that matches the current block's classification is found, the search terminates and that block's coefficients are used for prediction. If a match is not found, the block with the closest classification is used for prediction provided that the closest classification is within a tolerance level of the current classification. For directional classification, this tolerance level can be in terms of degrees, such as, for example, within 10 degrees, 23 degrees, etc. For nondirectional classifications the closeness tolerance is determined from a training set.

Figure 5:
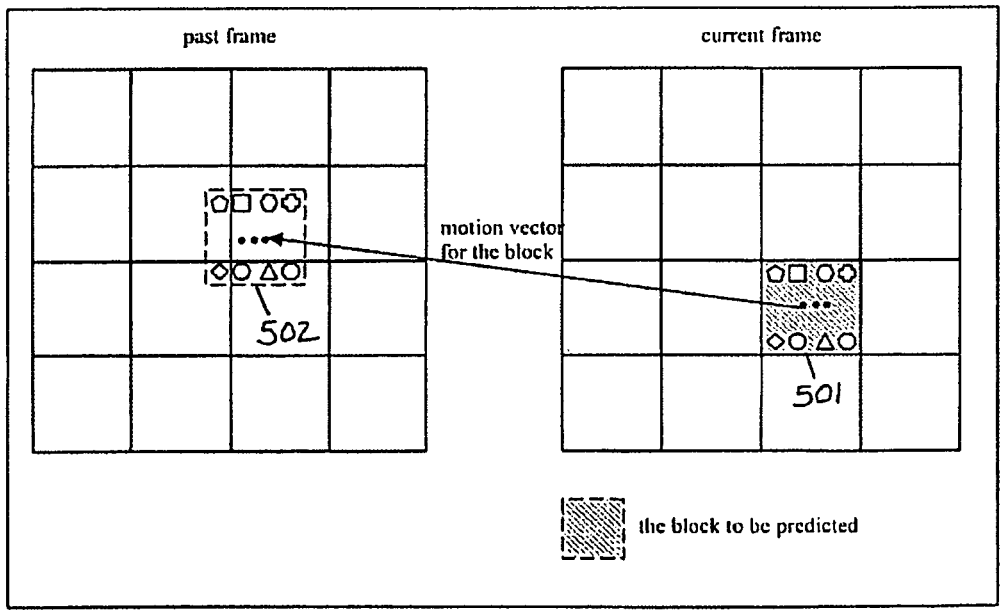
FIG. 5 illustrates one embodiment of motion compensated coefficient prediction process for predicting motion compensated coefficients from the blocks on a past frame.

In one embodiment, prediction for video compression is performed by using motion vector information as shown in FIG. 5. For block $B_i^n$ on frame $f_k$, (e.g., block 501) the motion vector is used to find the corresponding block on the reference frame $f_l$: l<k (e.g., block 502).

Figure 7:
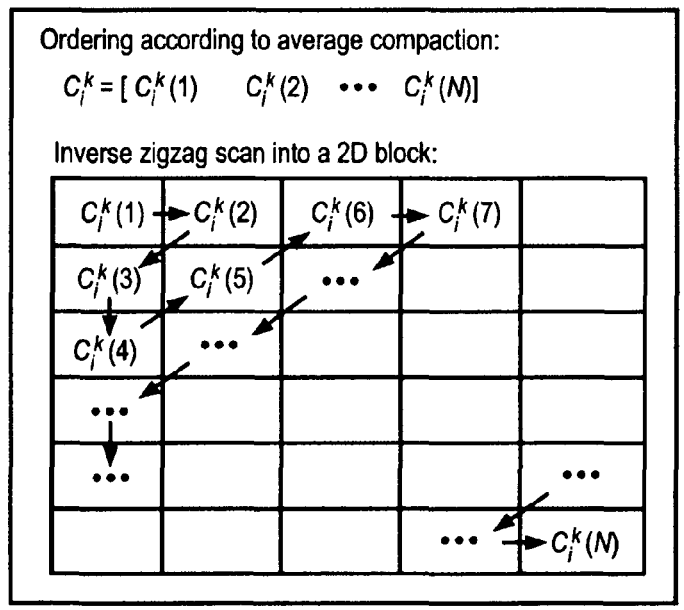
FIG. 7 shows an example of a mapping of zigzag scanning of coefficients from power ordered coefficients.
Figure 8:
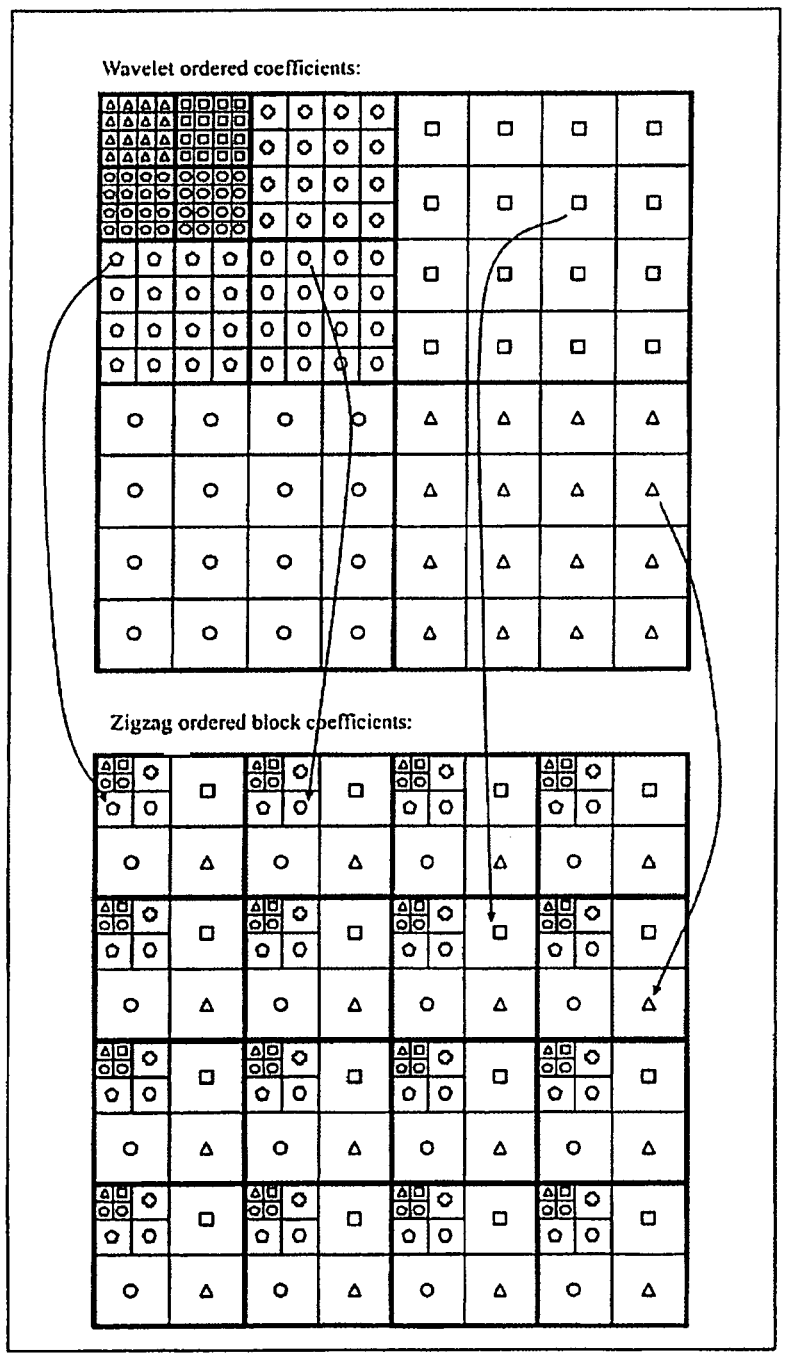
FIG. 8 shows an example of wavelet ordering of transform coefficients for EZW/SPIHT like entropy coders.

In one embodiment, the difference between the transformed coefficients and the predicted coefficients are ordered according to the type of the entropy encoder used. The ordering could be performed according to average compaction. If an H264-like entropy coder is used, compaction ordered coefficients are inverse-zigzag ordered into a 2D block as shown in FIG. 7, and then passed to the entropy coder. If an EZW/SPIHT-like entropy coder is used, the compaction ordered coefficients are first inverse-zigzag ordered into a 2D block as shown in FIG. 7, then arranged in the corresponding frequency sub-bands as shown in FIG. 8 (as disclosed in Xiong, et al, "A DCT-based Embedded Image Coder," IEEE Signal Processing Letters, Vol. 3, 11, pp. 289-290, November, 1996 (incorporated herein by reference)), and then passed to the entropy coder.

In one embodiment, for image compression, a quad-tree is generated. In one embodiment, the quad-tree is used to encode the block classification. Each node in the quad-tree is assigned a direction, and all of the blocks in the same quad-tree node are encoded using that direction's transform. Let $R_{up}$ denote the bitrate of the coefficients and classification information for transmitting an un-partitioned quad-tree node, and let $D_{up}$ denote the distortion incurred by transform and quantization of the coefficients of all of the blocks in the un-partitioned quad-tree node. $R_p$, $D_p$ are the sum of bitrate and distortion, respectively, for partitioning the same node into 4 smaller nodes. $R_{up}$ and $R_p$ also include the overhead of transmitting the direction for each node. This can be computed as a fixed number of bits. For example, for $R_p$, since 4 new directions are generated, the overhead can be $4 \times \lceil \log_2 N \rceil$ bits. For the un-partitioned case, the overhead could be $\lceil \log_2 N \rceil$ since there is only one direction. In the one embodiment, the quadtree nodes are transformed using adaptive transform sizes. Each node can use a different transform size depending on the size of the node and based on the available transform sizes in the LUT. For example, if the biggest transform size in the LUT is 16×16, then a node of size 32×32 is transformed using 16×16 blocks. If the node is sized 16×16 then a single block transform is sufficient. Then the bitrate of the coefficients can be determined using the probability estimates for arithmetic coding, or directly from the codeword lengths for variable length coding. Then the quad-tree generation algorithm compares the Lagrange cost of partitioning or not portioning and chooses to partition the node if $D_p + \lambda R_p < D_{up} + \lambda R_{up}$. Other cost metrics may be used.

Figure 9:
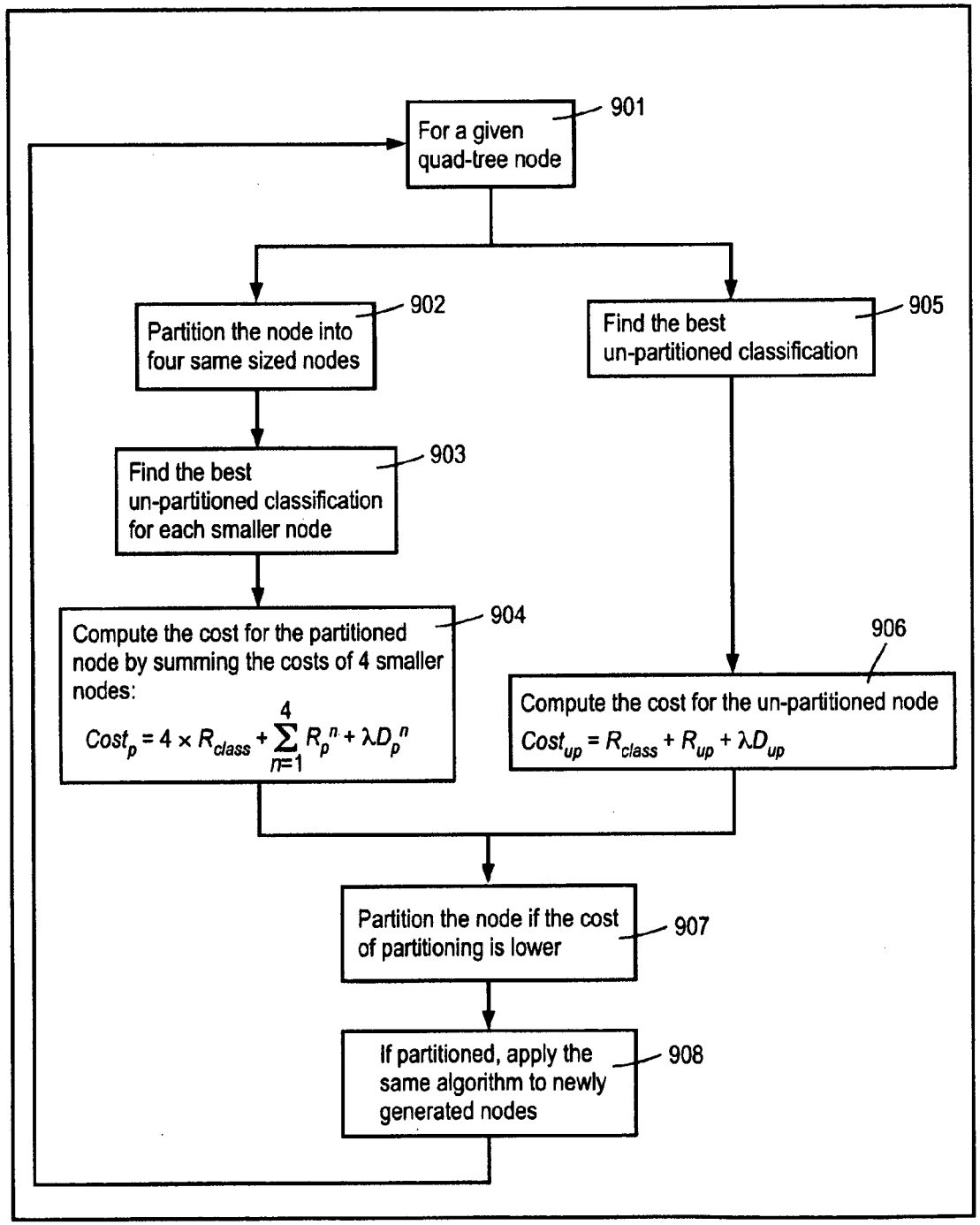
FIG. 9 is a flow diagram of one embodiment of a process for performing quadtree partitioning algorithm.

FIG. 9 is a flow diagram of one embodiment of an optimal quad-tree partitioning process. The process is performed by processing logic that may comprise hardware (e.g., circuitry, dedicated logic, etc.), software (such as is run on a general purpose computer system or a dedicated machine), or a combination of both. The process starts through the whole image as the first node. $R_{class}$ is the bit rate of sending the classification information for a single node. Finding the best classification also involves finding the transformed size, which is simply a problem of comparing the same rate distortion based cost function.

Referring to FIG. 9, the process begins, for a given quad-tree node (901), by processing logic partitioning the node into four same sized nodes (processing block 902) and finding the best un-partitioned classification for each smaller node (903), and computing the cost for the partitioned node by summing the costs of four similar nodes (processing block 204). In one embodiment, this cost is calculated as follows:

$$Cost_p = 4 \times R_{class} + \sum_{n=1}^{4} R_p^n + \lambda D_p^n.$$

Thereafter, the process transitions to processing block 907.

At the same time, processing logic finds the best un-partitioned classification (processing block 903) and computes the cost for the un-partitioned node (processing block 906). In one embodiment, the cost for the un-partitioned node is computed according to the following equation:

$$\text{Cost}_{up} = R_{class} + R_{up} + \lambda D_p.$$

Thereafter, the process transitions to processing block 907.

At processing block 907, processing logic partitions the node if the cost of partitioning is lower. Then, if partitioned, processing logic applies the same algorithm to newly generated nodes (processing block 908) and the process transitions to processing block 901 where the process repeats.

Figure 10:
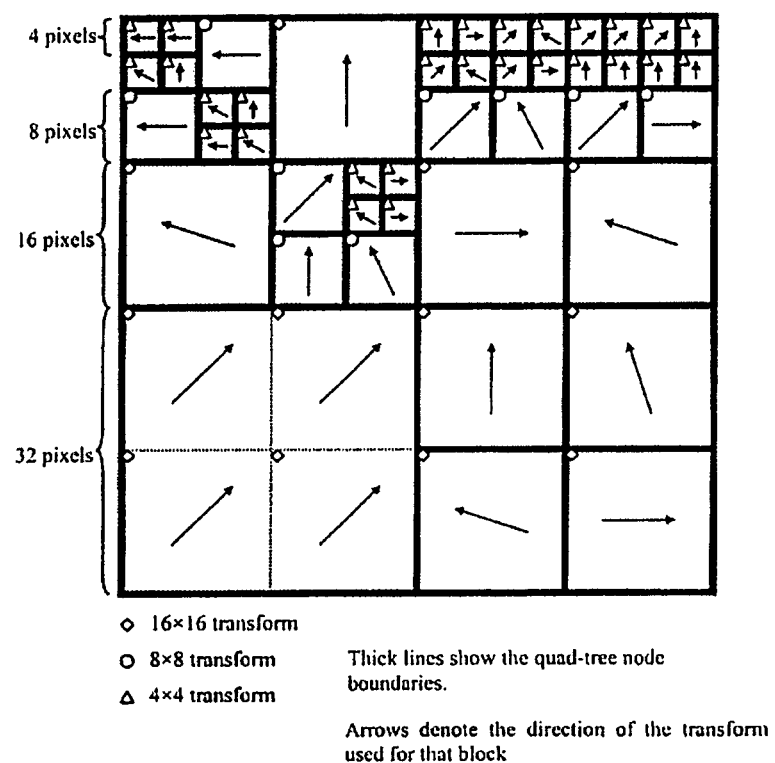
FIG. 10 illustrates quad-tree partitioning showing the nodes and the adaptive transform sizes.

The generated quad-tree may have varying node sizes. At each node, the most suitable transform size is chosen. If a node is bigger than the biggest available transform in the LUT, the node is transformed as a multitude of blocks. FIG. 10 shows an example of adaptive transform sizes in a quad-tree partitioning. Referring to FIG. 10, thick lines show the quad-tree node boundaries and the arrows denote the direction of the transform used for the block.

In one embodiment, multiple transforms are used to cover quad-tree nodes that are larger than the biggest available transform size. For example, in FIG. 10 the lower left node, which is which is 32×32 is encoded using 4 blocks of 16×16 transforms.

In one embodiment, for video compression, the encoding of side-information is based on the previously encoded frames. In such a case, when block $B_i^n$ on frame $f_k$ is being encoded, the corresponding block on frame $f_l$: l<k is found using the motion vectors. Let $\tilde{B}_i^n$ denote the corresponding block on frame $f_l$. Then the classification of $B_i^n$ is entropy coded conditioned on the classification computed for $\tilde{B}_i^n$. In another embodiment, the encoder uses the classification computed for $\tilde{B}_i^n$. Therefore, side-information can be completely eliminated.

In one embodiment, the inverse of the encoding process described above is performed by a decoder. For example, the inverse of operations in the flow diagram of FIG. 1A would be performed to decode data encoded as set forth in FIG. 1A. This would be well-known to one skilled in the art.

Figure 12:
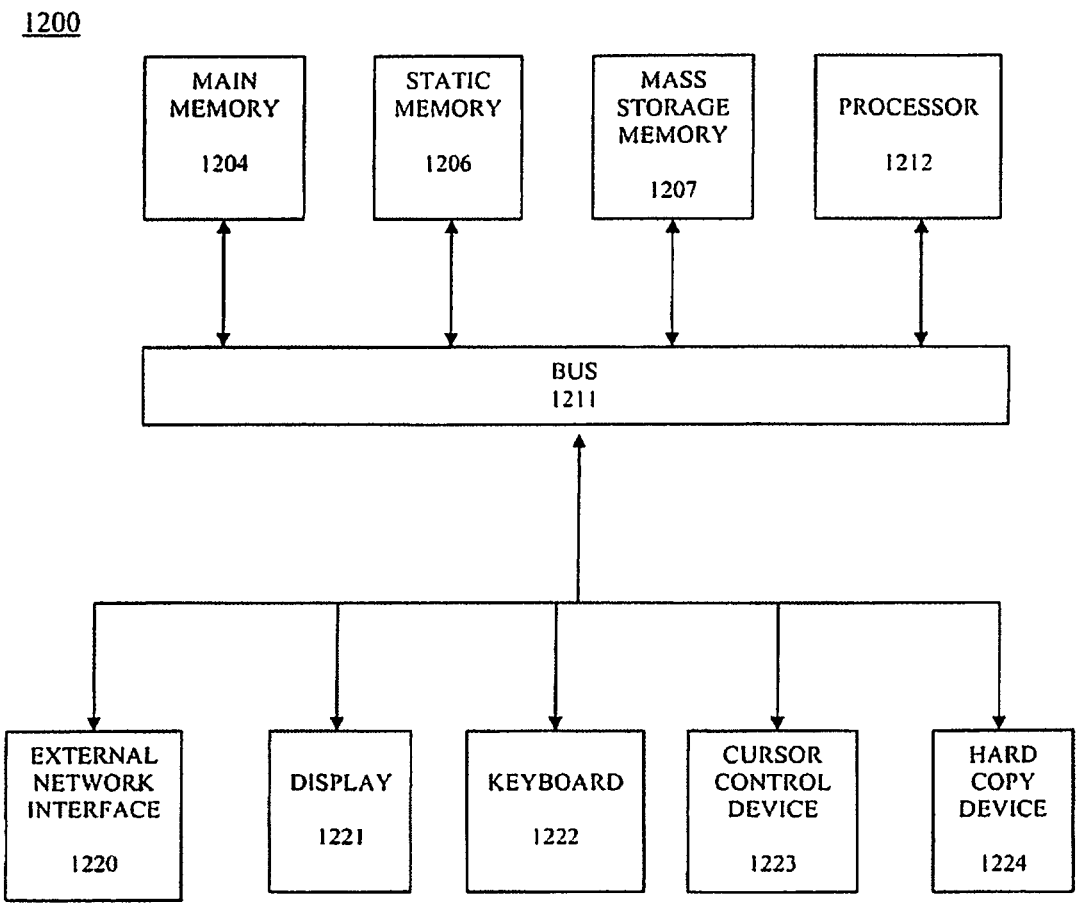
FIG. 12 is a block diagram of a computer system.

Embodiments of the invention can accommodate block based video and image coders. Embodiments of the invention are applicable to various initial classifications, and are not limited to first order geometric flow. In one embodiment, the transform optimization is performed jointly with the classifications. The transform design is open to further regularization such as separable transforms for reducing computational complexity. The rate-distortion performance of embodiment of the invention on typical images and the visual quality of embodiments of the invention on typical images is above the prior art An Example of a Computer System FIG. 12 is a block diagram of an exemplary computer system that may perform one or more of the operations described herein. Referring to FIG. 12, computer system 1200 may comprise an exemplary client or server computer system. Computer system 1200 comprises a communication mechanism or bus 1211 for communicating information, and a processor 1212 coupled with bus 1211 for processing information. Processor 1212 includes a microprocessor, but is not limited to a microprocessor, such as, for example, Pentium™, PowerPC™, Alpha™, etc.

System 1200 further comprises a random access memory (RAM), or other dynamic storage device 1204 (referred to as main memory) coupled to bus 1211 for storing information and instructions to be executed by processor 1212. Main memory 1204 also may be used for storing temporary variables or other intermediate information during execution of instructions by processor 1212.

Computer system 1200 also comprises a read only memory (ROM) and/or other static storage device 1206 coupled to bus 1211 for storing static information and instructions for processor 1212, and a data storage device 1207, such as a magnetic disk or optical disk and its corresponding disk drive. Data storage device 1207 is coupled to bus 1211 for storing information and instructions.

Computer system 1200 may further be coupled to a display device 1221, such as a cathode ray tube (CRT) or liquid crystal display (LCD), coupled to bus 1211 for displaying information to a computer user. An alphanumeric input device 1222, including alphanumeric and other keys, may also be coupled to bus 1211 for communicating information and command selections to processor 1212. An additional user input device is cursor control 1223, such as a mouse, trackball, trackpad, stylus, or cursor direction keys, coupled to bus 1211 for communicating direction information and command selections to processor 1212, and for controlling cursor movement on display 1221.

Another device that may be coupled to bus 1211 is hard copy device 1224, which may be used for marking information on a medium such as paper, film, or similar types of media. Another device that may be coupled to bus 1211 is a wired/wireless communication capability 1225 to communication to a phone or handheld palm device.

Note that any or all of the components of system 1200 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
   receiving a block of data;
   classifying the block of data based on sparsity structure to obtain a block class;
   selecting one of a plurality of available directional, sparse orthonormal transforms to apply to the block based on the block class of the block, the sparse transform having a one-to-one correspondence to the block class, and wherein sparse transforms of the plurality of directional, sparse orthonormal transforms are created for each block class by an iterative process, wherein for each iteration of the iterative process that creates the sparse transforms for each block class, the iterative process first optimizes the sparse transforms and coefficients for the transforms, and then reclassifies optimal transforms based on rate distortion; and
   applying the selected transform to the block to generate a plurality of coefficients, thereby producing a compressed version of the block.

2. The method defined in claim 1 wherein results of classifying the block include block classification information indicative of a classification of the block.

3. The method defined in claim 2 further comprising sending the block classification information to a decoder.

4. The method defined in claim 3 wherein the block is part of an intra frame being compressed.

5. The method defined in claim 2 further comprising encoding the block classification information using a quadtree.

6. The method defined in claim 2 wherein results of classifying the block include block classification information, and further comprising a decoder deriving the block classification information indicative of a classification of the block from frame prediction.

7. The method defined in claim 6 further comprising predicting and conditionally encoding the classification information based on side-information that is determined and transmitted for the past frames.

8. The method defined in claim 6 wherein the decoder derives the block classification information when decompressing inter frames.

9. The method defined in claim 2 further comprising performing block based prediction of coefficients based on the block classification information and direction information.

10. The method defined in claim 1 wherein the data representing the block comprises a vector of transform coefficients.

11. The method defined in claim 10 wherein the vector of transform coefficients comprises one of a group consisting of a vector of lapped transform coefficients, a vector of wavelet transform coefficients, and a vector of Fourier transform coefficients.

12. The method defined in claim 11 wherein the block has a size of K×K and the vector of transform coefficients has a second size of $K^2 \times 1$, where K is an integer.

13. The method defined in claim 1 wherein one or more transforms of the plurality of directional transforms are created by an iterative process in which blocks of training data are classified and then subjected to the application of transforms repeatedly.

14. The method defined in claim 1 wherein the plurality of available transforms includes a DCT transform.

15. The method defined in claim 1 wherein the plurality of available transforms comprises transforms optimized for various quantization and block size parameters.

16. The method defined in claim 1 wherein each of the block classifications is associated with one of the plurality of available transforms.

17. The method defined in claim 16 wherein the block classifications and plurality of transforms are jointly and iteratively optimized in a rate-distortion sense.

18. The method defined in claim 1 further comprising:
reordering transform coefficients prior to encoding.

19. The method defined in claim 18 wherein each of the plurality of available transforms is associated with a distinct zig-zag pattern, and further comprising reordering transform coefficients comprises applying a zig-zag pattern associated with the transform coefficients.

20. The method defined in claim 18 further comprising:
quantizing the plurality of coefficients to produce quantized coefficients; and
entropy coding the quantized coefficients.

21. The method defined in claim 20 wherein the quantized coefficients comprise predicted coefficients.

22. The method defined in claim 18 further comprising:
generating prediction coefficients for the block;
computing residual coefficients as a difference between the prediction coefficients and the plurality of coefficients;
quantizing the residual coefficients to produce quantized coefficients; and
entropy coding the quantized coefficients.

23. The method defined in claim 1 wherein the block of data comprises one selected from a group consisting of an image and video.

24. A method comprising:
receiving a block of data;
classifying the block of data based on sparsity structure to obtain a block class, wherein classifying the block of data based on sparsity structure comprises classifying the block selecting a Lagrange multiplier λ based on a target distortion level and solving an equation for the block, where the equation is:

$$\text{Class}\{X\} = \underset{j}{\text{argmin}}\left[\underset{C}{\min}\|X - G_j C\|^2 + \lambda\|C\|_0\right]$$

where X is the block, $G_j$ is a transform and C are coefficients of the block;
selecting one of a plurality of available directional, sparse orthonormal transforms to apply to the block based on the block class of the block, the sparse transform having a one-to-one correspondence to the block class; and
applying the selected transform to the block to generate a plurality of coefficients, thereby producing a compressed version of the block.

25. The method defined in claim 1 further comprising:
generating side information that includes designed transforms and directional classification information; and
sending the side information to a decoder.

26. An article of manufacture having one or more non-transitory computer readable storage media storing instructions which, when executed by a system, cause the system to perform a method comprising:
receiving a block of data;
classifying the block of data based sparsity structure to obtain a block class;
selecting one of a plurality of available directional, sparse orthonormal transforms to apply to the block based on the block class of the block, the sparse transform having a one-to-one correspondence to the class, and wherein sparse transforms of the plurality of directional, sparse orthonormal transforms are created for each block class by an iterative process, wherein for each iteration of the iterative process that creates the sparse transforms for each block class, the iterative process first optimizes the sparse transforms and coefficients for the transforms, and then reclassifies optimal transforms based on rate distortion; and
applying the selected transform to the block to generate a plurality of coefficients, thereby producing a compressed version of the block.

27. A decoding process comprising:
receiving a compressed codestream;
determining a block classification for a group of coefficients in the compressed codestream;
selecting one of a plurality of available directional, sparse orthonormal inverse transforms based on the block classification, the sparse transform having a one-to-one correspondence to the block classification, and wherein sparse transforms of the plurality of directional, sparse orthonormal inverse transforms are created for each block classification by an iterative process, wherein for each iteration of the iterative process that creates the sparse transforms for each block class, the iterative process first optimizes the sparse transforms and coefficients for the transforms, and then reclassifies optimal transforms based on rate distortion; and applying the selected inverse transform to the group of coefficients.

28. The decoding process defined in claim 27 further comprising deriving block classification information from frame prediction.

29. The decoding process defined in claim 27 wherein information indication of the block classification is encoded using a quadtree.

* * * * *